(12) United States Patent
Ferris et al.

(10) Patent No.: US 12,573,314 B1
(45) Date of Patent: Mar. 10, 2026

(54) VIRTUAL COMBAT TRAINING SYSTEM WITH INDIVIDUAL ELECTRICAL SHOCK UNITS

(71) Applicant: Virtra, Inc., Tempe, AZ (US)

(72) Inventors: Robert D. Ferris, Mesa, AZ (US);
John B. Kinnard, Mesa, AZ (US);
David W. Coggins, Chandler, AZ (US)

(73) Assignee: Virtra, Inc., Tempe, AZ (US)

( * ) Notice: Subject to any disclaimer, the term of this patent is extended or adjusted under 35 U.S.C. 154(b) by 1011 days.

(21) Appl. No.: 17/713,128

(22) Filed: Apr. 4, 2022

(51) Int. Cl.
*G09B 9/00* (2006.01)
*G06F 3/01* (2006.01)

(52) U.S. Cl.
CPC ............ *G09B 9/003* (2013.01); *G06F 3/016* (2013.01)

(58) Field of Classification Search
None
See application file for complete search history.

(56) References Cited

U.S. PATENT DOCUMENTS

| | | | |
|---|---|---|---|
| 8,016,594 B2 | 9/2011 | Ferris | |
| 8,894,412 B1 | 11/2014 | Malin | |
| 10,436,539 B2 | 10/2019 | Tiberius | |
| 2006/0105299 A1 | 5/2006 | Ferris | |
| 2006/0121419 A1 | 6/2006 | Ferris | |
| 2013/0171596 A1* | 7/2013 | French | G09B 19/00 |
| | | | 434/236 |
| 2017/0176127 A1 | 6/2017 | Ferris | |
| 2017/0372632 A1 | 12/2017 | Baker | |
| 2018/0036531 A1* | 2/2018 | Schwarz | A61B 5/332 |

* cited by examiner

*Primary Examiner* — James B Hull
(74) *Attorney, Agent, or Firm* — Kenneth C. Booth; Booth Udall, PLC

(57) ABSTRACT

A virtual combat training system includes a plurality of shock units adapted to attach to a different part of a body of a trainee, a helmet to display a virtual environment, a body node on the body of the trainee and a central control unit remote from the trainee. The central control unit tracks location data of the shock units including absolute position of each shock unit in relation to the central control unit and a relative position of each shock unit in relation to the other shock units, determines a location and orientation of the trainee, transmits actuation signals to the shock units to simulate an injury in response to events occurring within the virtual environment based on the location and the orientation of the trainee, and transmits virtual environment data to the virtual technology helmet. The body node communicates between the shock units and the central control unit.

18 Claims, 4 Drawing Sheets

VIRTUAL COMBAT TRAINING SYSTEM WITH INDIVIDUAL ELECTRICAL SHOCK UNITS

TECHNICAL FIELD

Aspects of this document relate generally to a virtual combat training system, and more specifically to a system with detailed real-time information regarding the location and orient of the trainee within a virtual environment.

BACKGROUND

There is a need for effective training for law enforcement, security officers, and the military. One aspect of effective training that is lacking is training to make rapid decisions in realistic scenarios while under the threat of injury, such as when threatened by an individual with a firearm or other weapon. While some attempts have been made at simulation systems, these systems often fail to accurately simulate real-life scenarios in a realistic way.

SUMMARY

Aspects of this document relate to a virtual combat training system, comprising a plurality of shock units, wherein each shock unit of the plurality of shock units is adapted to attach to a different part of a body of a single trainee and provide an electric shock to the respective part of the body of the trainee, a virtual technology helmet configured to couple to a head of the trainee and display a virtual environment to the trainee, a central control unit configured to be located in a position remote from the trainee and configured to: track location data of the plurality of shock units, wherein the location data comprises an absolute position of each shock unit of the plurality of shock units in relation to the central control unit and a relative position of each shock unit of the plurality of shock units in relation to the other shock units of the plurality of shock units; determine a location and an orientation of the trainee based on the absolute position and the relative position of each shock unit of the plurality of shock units; transmit actuation signals to the plurality of shock units to simulate an injury in response to events occurring within the virtual environment based on the location and the orientation of the trainee; and transmit virtual environment data to the virtual technology helmet to display the virtual environment and the virtual events occurring within the virtual environment to the trainee based on the location and the orientation of the trainee; and a body node positioned on the body of the trainee and communicatively coupled to the central control unit and to the plurality of shock units, the body node configured to: receive the location data from each of the plurality of shock units; communicate the location data to the central control unit; receive instructions for the plurality of shock units and the virtual technology helmet from the central control unit; and communicate the instructions to the plurality of shock units and the virtual technology helmet.

Particular embodiments may comprise one or more of the following features. The plurality of shock units may be hard-wired to the body node. The plurality of shock units may be wirelessly coupled to the body node. The location data may further comprise an angular position of each shock unit of the plurality of shock units in relation to a fixed direction, wherein the fixed direction is magnetic North, and wherein the location and orientation of the trainee is further determined based on the angular position of each shock unit of the plurality of shock units. Each of the plurality of shock units may be configured to simulate an injury to the part of the body of the trainee to which the respective one of the plurality of shock units is attached based on a position and orientation of the respective one of the plurality of shock units in relation to objects within the virtual environment.

Aspects of this disclosure relate to a virtual combat training system, comprising a plurality of shock units, wherein each shock unit of the plurality of shock units is adapted to attach to a different part of a body of a single trainee and provide an electric shock to the respective part of the body of the trainee, a virtual technology helmet configured to couple to a head of the trainee and display a virtual environment to the trainee, and a central control unit communicatively coupled to the plurality of shock units, the central control unit configured to: track location data of the plurality of shock units, wherein the location data comprises an absolute position of each shock unit of the plurality of shock units in relation to a fixed point; determine a location of the trainee based on the absolute position of each shock unit of the plurality of shock units; transmit actuation signals to the plurality of shock units to simulate an injury in response to events occurring within the virtual environment based on the location of the trainee; and transmit virtual environment data to the virtual technology helmet to display the virtual environment and the virtual events occurring within the virtual environment to the trainee based on the location of the trainee.

Particular embodiments may comprise one or more of the following features. The central control unit may be configured to be located in a position remote from the trainee. The location data may further comprise a relative position of each shock unit of the plurality of shock units in relation to the other shock units of the plurality of shock units. The central control unit may be further configured to determine an orientation of the trainee based on the location data of the plurality of shock units. A body node positioned on the body of the trainee and communicatively coupled to the central control unit and to the plurality of shock units, the body node configured to: receive the location data from each of the plurality of shock units, communicate the location data to the central control unit, receive instructions for the plurality of shock units and the virtual technology helmet from the central control unit, and communicate the instructions to the plurality of shock units and the virtual technology helmet.

Aspects of this disclosure relate to a virtual combat training system, comprising a plurality of shock units, wherein each shock unit of the plurality of shock units is adapted to provide an electric shock to a different part of a body of a single trainee, a virtual technology helmet configured to display a virtual environment to the trainee, and a central control unit communicatively coupled to the plurality of shock units, the central control unit configured to: determine a location of the trainee based on location data of each shock unit of the plurality of shock units; transmit actuation signals to the plurality of shock units to simulate an injury in response to events occurring within the virtual environment based on the location of the trainee; and transmit virtual environment data to the virtual technology helmet to display the virtual environment and the virtual events occurring within the virtual environment to the trainee based on the location of the trainee.

Particular embodiments may comprise one or more of the following features. The location data may comprise an absolute position of each shock unit of the plurality of shock units in relation to a fixed point. The location data may comprise an angular position of each shock unit of the plurality of shock units in relation to a fixed direction. The fixed direction is magnetic North. The location data may comprise a relative position of each shock unit of the plurality of shock units in relation to the other shock units of the plurality of shock units. The central control unit may be configured to be located in a position remote from the trainee. The central control unit may be further configured to determine an orientation of the trainee based on the location data of the plurality of shock units. A body node positioned on the body of the trainee and communicatively coupled to the central control unit and to the plurality of shock units, the body node configured to receive the location data from each of the plurality of shock units, communicate the location data to the central control unit, receive instructions for the plurality of shock units and the virtual technology helmet from the central control unit, and communicate the instructions to the plurality of shock units and the virtual technology helmet. The plurality of shock units may be hard-wired to the body node. The plurality of shock units may be wirelessly coupled to the body node.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . "or "step for performing the function of . . . ," if the claims also recite any structure, material or acts in support of that means or step, or that perform the recited function, then it is the clear intention of the inventors not to invoke the provisions of 35

U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
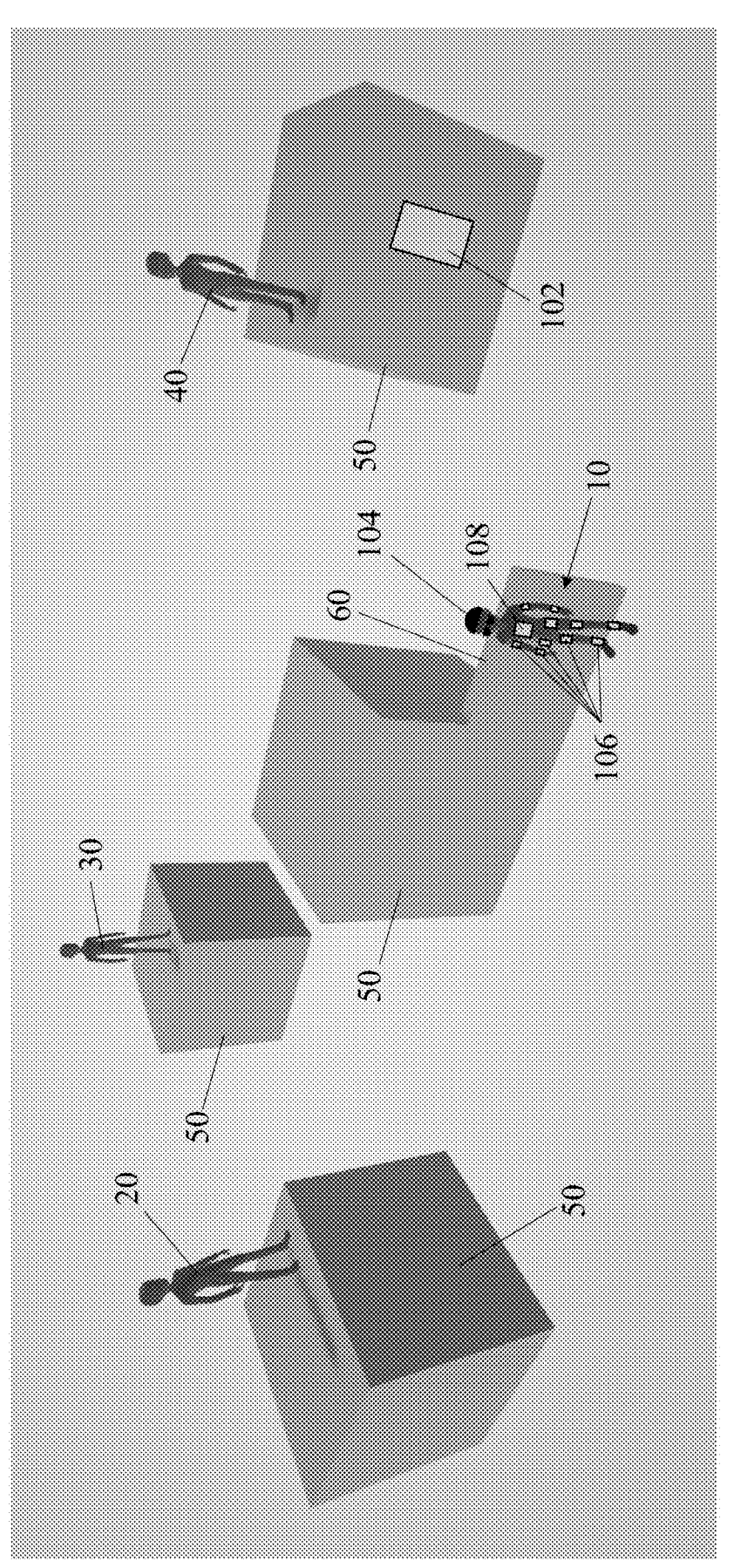
FIG. 1 is a perspective view of a trainee in a virtual environment using a virtual combat training system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure relates to a virtual combat training system 100. The virtual combat training system 100 is designed to improve the effectiveness of training for law enforcement, security officers, and the military by creating a more effective simulation of real-life situations. To that end, the virtual combat training system 100 may comprise a central control unit 102, a virtual technology helmet 104, and a plurality of shock units 106. The virtual combat training system 100 may also comprise a body node 108.

The central control unit 102 is communicatively coupled to the plurality of shock units 106 and may be located in a position remote from the trainee 10, as shown in FIG. 1. The central control unit 102 may be configured to perform any actions required to enable the virtual combat training system 100 to create and present a virtual environment and a virtual scenario to the trainee 10. For example, the combat training system 100 may be configured to track location data of the plurality of shock units 106. The location data may comprise an absolute position of each shock unit 106 of the plurality of shock units 106 in relation to the central control unit 102, a relative position of each shock unit 106 of the plurality of shock units 106 in relation to the other shock units 106 of the plurality of shock units 106, and/or an angular position of each shock unit 106 of the plurality of shock units 106 in relation to a fixed direction. The fixed direction may be magnetic North or some other direction selected. The combat training system 100 may also be configured to determine a location and an orientation of the trainee 10 based on the absolute position, the relative position, and/or the angular position of each shock unit 106 of the plurality of shock units 106. Thus, the combat training system 100 is capable of knowing the trainee's location and orientation within the virtual environment as the trainee 10 moves around and interacts with the virtual environment.

It should be understood that the location and orientation of the trainee 10 can be determined using a number of combinations of the absolute positions, relative positions, and angular positions of the shock units 106. For example, in one embodiment, the central control unit 102 may use the absolute position of a shock unit 106 located on the back of the trainee 10 to track the location of the trainee 10, and then use the relative positions of the remaining shock units 106 in relation to the shock unit 106 on the back of the trainee 10 to further determine the location and orientation of the rest of the trainee's body, such as the limbs of the trainee 10. In another embodiment, the central control unit 102 may use the absolute position for each of the shock units 106 without using the relative or angular positions, determining the orientation of the trainee 10 by comparing the absolute position of each shock unit 106. In yet another embodiment, the central control unit 102 may use the absolute position, the relative position, and the angular position for each of the shock units 106 to determine the location and orientation of the trainee 10. While this may duplicate some effort and over-constrain the location and orientation of the trainee 10, it allows errors in measurement to be corrected and provides a clearer picture of the trainee's exact location and orientation.

Figure 2:
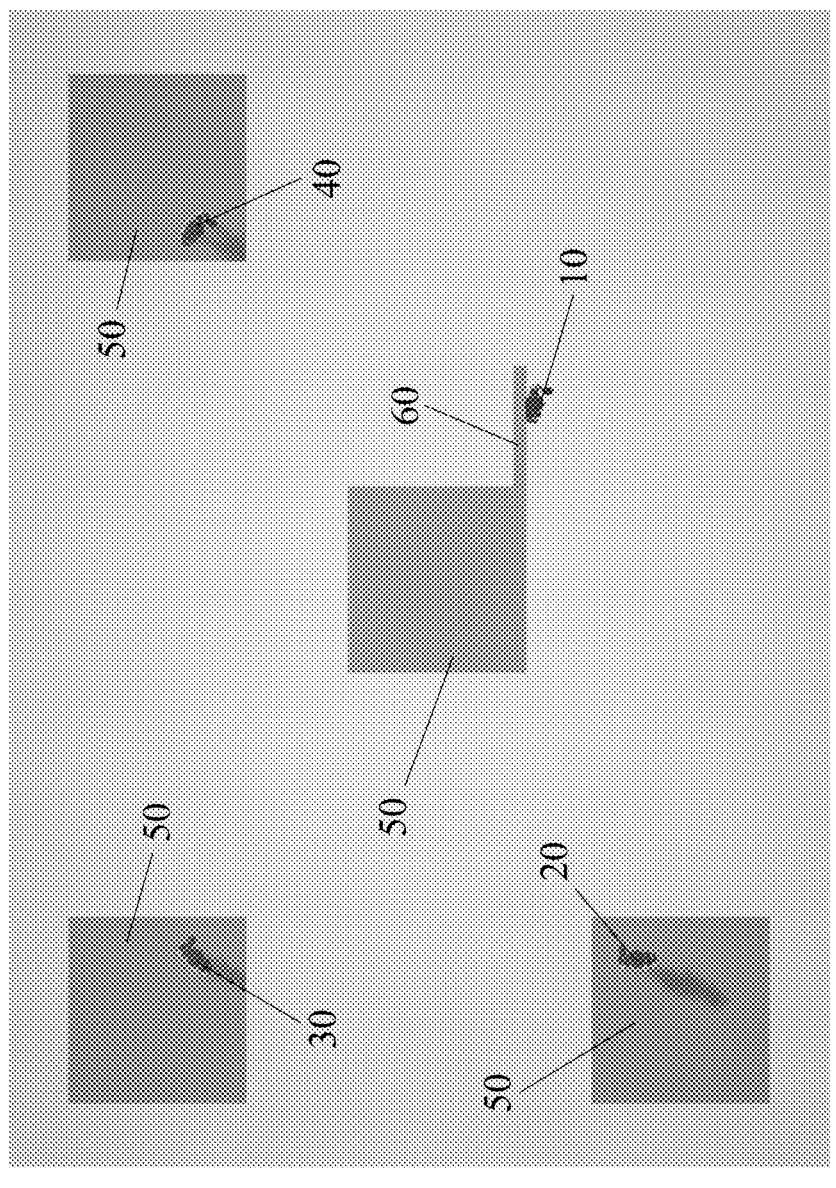
FIG. 2 is a top view of the trainee in the virtual environment shown in FIG. 1.

The virtual technology helmet 104 is configured to couple with the head of the trainee 10 and is configured to display the virtual environment to the trainee 10. Some elements of the virtual environment may also be present in the physical environment around the trainee 10. For example, as shown in FIGS. 1-2, the first attacker 20, the second attacker 30, and the third attacker 40 may all only exist in the virtual environment. Thus, if the trainee 10 removed the virtual technology helmet 104, the trainee 10 would not see the first attacker 20, the second attacker 30, or the third attacker 40. However, the obstacles 50 and the barrier 60 may be present in the physical environment around the trainee 10, thus allowing the trainee 10 to interact with the physical environment during the training scenario. In other embodiments, the obstacles 50 and the barrier 60 may only exist in the virtual environment. Thus, the virtual technology helmet 104 may be configured to overlay the virtual environment and virtual events over the physical environment around the trainee 10. Alternatively, the virtual technology helmet 104 may create a completely virtual environment that is unrelated to the physical surroundings of the trainee 10. The central control unit 102 may be configured to transmit virtual environment data to the virtual technology helmet 104 to display the virtual environment and the virtual events occurring within the virtual environment to the trainee 10. The virtual environment data may be based on the location and/or the orientation of the trainee 10. Thus, the central control unit 102 uses the location and orientation of the trainee 10 to determine the virtual environment data needed by the virtual technology helmet 104 to accurately display the virtual environment and the virtual events to the trainee 10 from the correct perspective based on the trainee's current location and orientation.

As shown in FIG. 1, each shock unit 106 of the plurality of shock units 106 may be adapted to attach to a different part of a body of the trainee 10. Thus, the plurality of shock units 106 are configured to provide an electric shock to the respective part of the body of the trainee 10 that each shock unit 106 is attached to. The central control unit 102 may be configured to transmit actuation signals to the plurality of shock units 106 to simulate an injury. This may occur in response to events occurring within the virtual environment and may be based on the location and the orientation of the trainee 10. For example, as shown in FIGS. 1-2, based on the current location of the trainee 10, the first attacker 20 has a clear view of the trainee 10, the second attacker 30 has no view of the trainee 10, and the third attacker 40 has a limited view of the trainee 10, only being able to see the trainee's shoulders and head. In the virtual environment, any of these attackers may fire a shot towards the trainee 10. When a shot occurs in the virtual environment, the central control unit 102 will only transmit actuation signals to the shock units 106 that are within sight of the attacker. Thus, for the first attacker 20, any of the shock units 106 on the right and front sides of the trainee 10 are potential targets. On the other hand, for the second attacker 30, all of the shock units 106 are blocked from the second attacker's view by the obstacle 50, and no shock units 106 would be activated. For the third attacker 40, only shock units 106 on the back of the trainee's head or shoulders are potential targets because the barrier 60 and the trainee's body blocks the remaining shock units 106 from the third attacker's 40 sight. While each of the plurality of shock units 106 is configured to simulate an injury to the part of the body of the trainee 10 to which the respective one of the plurality of shock units 106 is attached, this only occurs based on a position and orientation of the respective one of the plurality of shock units 106 in relation to objects such as the obstacles 50 and barriers 60 within the virtual environment. If the obstacles 50 or barriers 60 would interfere with the gunshot taking place within the virtual environment, then the respective shock unit 106 will not activate to simulate an injury. Thus, the trainee 10 is able to practice shielding his or her body by positioning himself or herself behind obstacles 50 and barriers 60. In addition, the trainee 10 is able to practice reacting to the movements of attackers within the virtual environment to obtain the greatest protection from harm.

Figure 3:
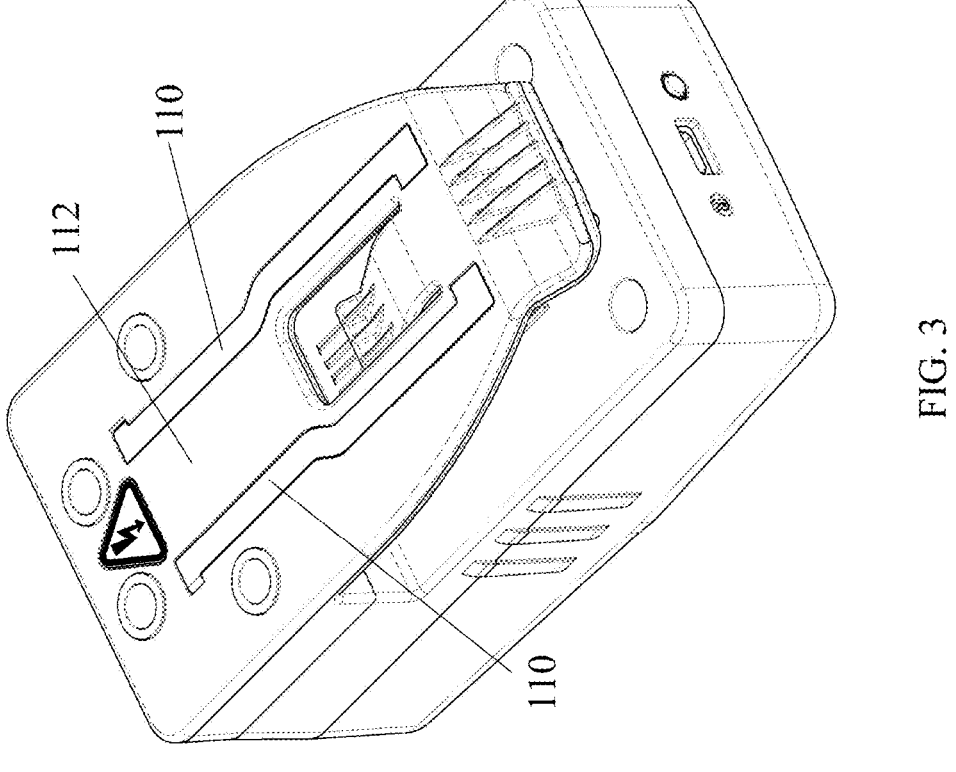
FIG. 3 is a perspective view of a shock unit of the virtual combat training system being used in FIG. 1.

An exemplary shock unit 106 is shown in FIG. 3 and disclosed in U.S. patent application Ser. No. 17/569,403 titled, "Projectile Impact Simulation Device", to Ferris, et al., filed Jan. 5, 2022, the disclosure of which is hereby incorporated herein by this reference. The electric shock is configured to simulate an injury, such as a gunshot wound. To that end, the shock unit 106 may have at least two pads 110 with a shock zone 112 between the at least two pads 110. The two pads 110 are configured to be adjacent to the trainee 10 when worn. When the central control unit 102 transmits actuation signals to a shock unit 106, the shock unit 106 simulates an injury by applying a voltage differential between the at least two pads 110. This causes the shock unit 106 to arc across the shock zone 112 when not attached to a trainee 10, or pass an electrical impulse through the trainee's body when attached to a trainee 10 shocking the trainee 10.

Figure 4:
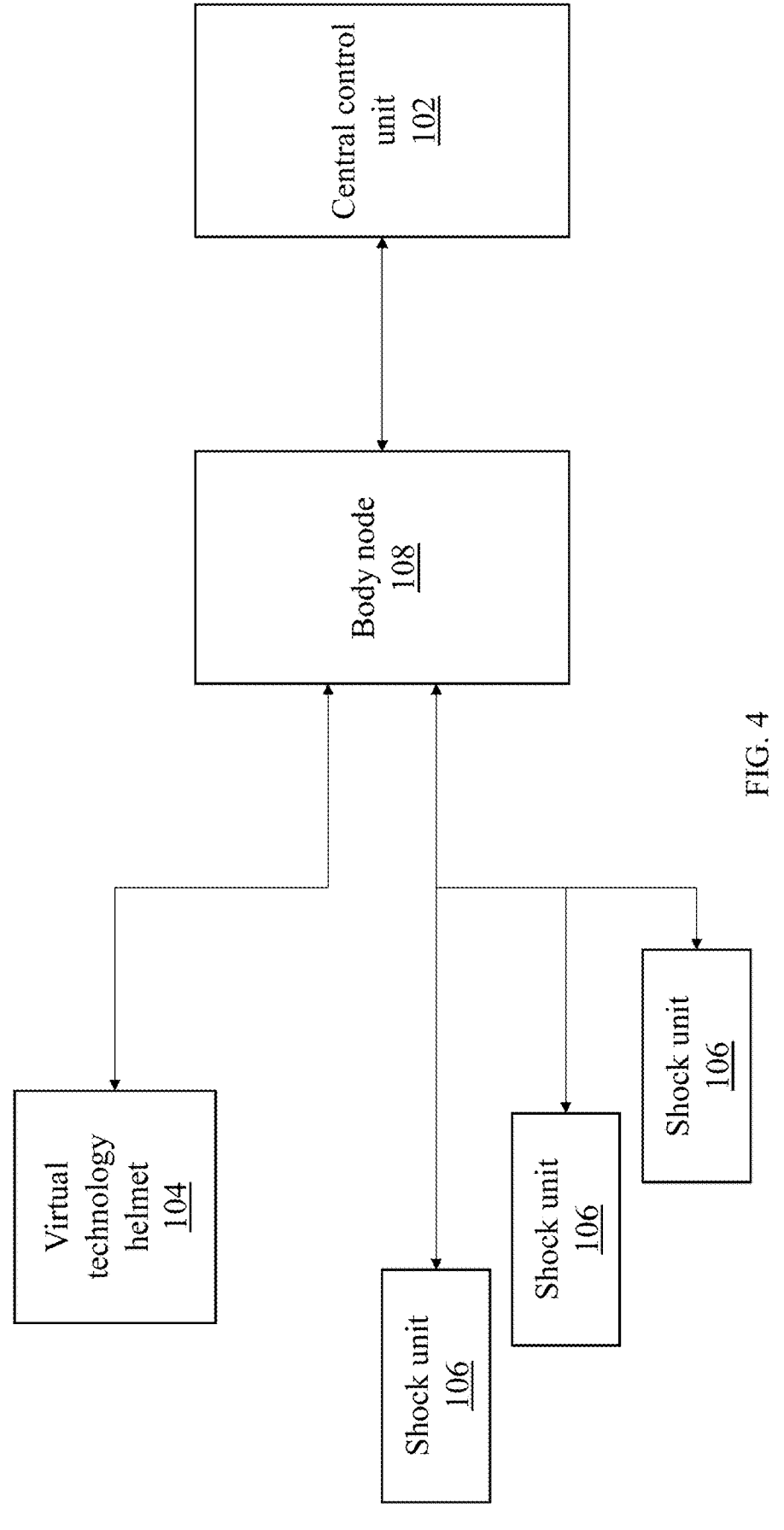
FIG. 4 is a system schematic of the virtual combat training system being used in FIG. 1.

In embodiments of the virtual combat training system 100 that have a body node 108, the body node 108 is positioned on the body of the trainee 10 and communicatively coupled to the central control unit 102 and to the plurality of shock units 106, as shown in FIG. 4. The body node 108 may act as the communicator between the central control unit 102 and the components of the virtual combat training system 100 coupled to the body of the trainee 10. Thus, the body node 108 may be configured to receive the location data from each of the plurality of shock units 106 and communicate the location data to the central control unit. In addition, the body node 108 may be configured to receive instructions for the plurality of shock units 106 and the virtual technology helmet 104 from the central control unit 102 and communicate those instructions to the plurality of shock units 106 and the virtual technology helmet 104. The plurality of shock units 106 may be hard-wired to the body node 108. Alternatively, the plurality of shock units 106 may be wirelessly coupled to the body node 108.

It will be understood that implementations of a virtual combat training system are not limited to the specific assemblies, devices and components disclosed in this document, as virtually any assemblies, devices and components consistent with the intended operation of a virtual combat training system may be used. Accordingly, for example, although particular virtual combat training systems, and other assemblies, devices and components are disclosed, such may include any shape, size, style, type, model, version, class, measurement, concentration, material, weight, quantity, and/or the like consistent with the intended operation of virtual combat training systems. Implementations are not limited to uses of any specific assemblies, devices and components; provided that the assemblies, devices and components selected are consistent with the intended operation of a virtual combat training system.

Accordingly, the components defining any virtual combat training system may be formed of any of many different types of materials or combinations thereof that can readily be formed into shaped objects provided that the materials selected are consistent with the intended operation of a virtual combat training system. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various virtual combat training systems may be manufactured using conventional procedures as added to and improved upon through the procedures described here. Some components defining a virtual combat training system may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling virtual combat training systems are not limited to the specific order of steps as disclosed in this document. Any steps or sequence of steps of the assembly of a virtual combat training system indicated herein are given as examples of possible steps or sequence of steps and not as limitations, since various assembly processes and sequences of steps may be used to assemble virtual combat training systems.

The implementations of a virtual combat training system described are by way of example or explanation and not by way of limitation. Rather, any description relating to the foregoing is for the exemplary purposes of this disclosure, and implementations may also be used with similar results for a variety of other applications employing a virtual combat training system.

What is claimed is:

1. A virtual combat training system, comprising:

a plurality of shock units, wherein each shock unit of the plurality of shock units is adapted to attach to a different part of a body of a single trainee and provide an electric shock to the respective part of the body of the trainee;

a virtual technology helmet configured to couple to a head of the trainee and display a virtual environment to the trainee;

a central control unit configured to be located in a position remote from the trainee and configured to:

track location data of the plurality of shock units through a body node adapted to attach to the respective part of the body of the trainee, wherein the location data comprises an absolute position of each shock unit of the plurality of shock units in relation to the central control unit, and receive a relative position of each shock unit of the plurality of shock units in relation to a position of the other shock units, of the plurality of shock units through the body node when the body node is attached to the respective part of the body of the trainee;

determine a location and an orientation of the trainee based on the absolute position and the relative position of each shock unit of the plurality of shock units;

transmit actuation signals to the plurality of shock units to simulate an injury in response to events occurring within the virtual environment based on the location and the orientation of the trainee; and transmit virtual environment data to the virtual technology helmet to display the virtual environment and the virtual events occurring within the virtual environment to the trainee based on the location and the orientation of the trainee; and wherein the body node is configured to be communicatively coupled to the central control unit and to the plurality of shock units, the body node further configured to:

receive the relative position data from each of the plurality of shock units indicating the relative position of each shock unit in relation to the body node;

communicate the relative position data to the central control unit;

receive instructions for the plurality of shock units and the virtual technology helmet from the central control unit; and communicate the instructions to the plurality of shock units and the virtual technology helmet; and wherein the central control unit is further configured to transmit actuation signals to respective shock units, of the plurality of shock units, only if the respective shock units are within sight of an attacker in the virtual environment taking into account the relative position data of each shock unit of the plurality of shock units and the respective body parts of the trainee in relation to a position of the attacker position in the virtual environment to avoid shocks where the trainee's body blocks then attacker's sight.

2. The virtual combat training system of claim 1, wherein the plurality of shock units is hard-wired to the body node.

3. The virtual combat training system of claim 1, wherein the plurality of shock units is wirelessly coupled to the body node.

4. The virtual combat training system of claim 1, wherein the location data further comprises an angular position of each shock unit of the plurality of shock units in relation to a fixed direction, wherein the fixed direction is magnetic North, and wherein the location and orientation of the trainee is further determined based on the angular position of each shock unit of the plurality of shock units.

5. The virtual combat training system of claim 1, wherein each of the plurality of shock units is configured to simulate an injury to the part of the body of the trainee to which the respective one of the plurality of shock units is attached based on a position and orientation of the respective one of the plurality of shock units in relation to objects within the virtual environment.

6. A virtual combat training system, comprising:

a plurality of shock units, wherein each shock unit of the plurality of shock units is adapted to attach to a different part of a body of a single trainee and provide an electric shock to the respective part of the body of the trainee;

a virtual technology helmet configured to couple to a head of the trainee and display a virtual environment to the trainee; and a central control unit communicatively coupled to the plurality of shock units, the central control unit configured to:

track location data of the plurality of shock units through a body node adapted to attach to the respective part of the body of the trainee, wherein the location data comprises an absolute position of each shock unit of the plurality of shock units in relation to a fixed point, and receive a relative position of each shock unit of the plurality of shock units in relation to a position of the other shock units, of the plurality of shock units, attached to the trainee;

determine a location of the trainee based on the absolute position and the relative position of each shock unit of the plurality of shock units;

transmit actuation signals to the plurality of shock units to simulate an injury in response to events occurring within the virtual environment based on the location of the trainee; and transmit virtual environment data to the virtual technology helmet to display the virtual environment and the virtual events occurring within the virtual environment to the trainee based on the location of the trainee;

wherein the central control unit is further configured to transmit actuation signals to respective shock units, of the plurality of shock units, only if the respective shock units are within sight of an attacker in the virtual environment taking into account the relative position data of each shock unit of the plurality of shock units and the respective body parts of the trainee in relation to a position of the attacker position in the virtual environment to avoid shocks where the trainee's body blocks the attacker's sight.

7. The virtual combat training system of claim 6, wherein the central control unit is configured to be located in a position remote from the trainee.

8. The virtual combat training system of claim 6, wherein the central control unit is further configured to determine an orientation of the trainee based on the location data of the plurality of shock units.

9. The virtual combat training system of claim 6, wherein the body node is configured to be communicatively coupled to the central control unit and to the plurality of shock units, the body node further configured to receive the location data from each of the plurality of shock units, communicate the location data to the central control unit, receive instructions for the plurality of shock units and the virtual technology helmet from the central control unit, and communicate the instructions to the plurality of shock units and the virtual technology helmet.

10. A virtual combat training system, comprising:

a plurality of shock units, wherein each shock unit of the plurality of shock units is adapted to provide an electric shock to a different part of a body of a single trainee;

a virtual technology helmet configured to display a virtual environment to the trainee; and a central control unit communicatively coupled to the plurality of shock units, the central control unit configured to:

determine a location of the trainee based on location data of each shock unit of the plurality of shock units received through a body node adapted to attach to a body part of the trainee, the location data comprising a relative position of each shock unit of the plurality of shock units in relation to a position of the other shock units, of the plurality of shock units, attached to the trainee;

transmit actuation signals to the plurality of shock units through the body node to simulate an injury in response to events occurring within the virtual environment based on the location of the trainee; and transmit virtual environment data to the virtual technology helmet to display the virtual environment and the virtual events occurring within the virtual environment to the trainee based on the location of the trainee;

wherein the central control unit is further configured to transmit actuation signals to respective shock units of the plurality of shock units only if the respective shock units are within sight of an attacker in the virtual environment taking into account the relative position data of each shock unit of the plurality of shock units and the parts of the body of the trainee in relation to a position of the attacker position in the virtual environment to avoid shocks where the trainee's body blocks the attacker's sight.

11. The virtual combat training system of claim 10, wherein the location data comprises an absolute position of each shock unit of the plurality of shock units in relation to a fixed point.

12. The virtual combat training system of claim 10, wherein the location data comprises an angular position of each shock unit of the plurality of shock units in relation to a fixed direction.

13. The virtual combat training system of claim 12, wherein the fixed direction is magnetic North.

14. The virtual combat training system of claim 10, wherein the central control unit is configured to be located in a position remote from the trainee.

15. The virtual combat training system of claim 10, wherein the central control unit is further configured to determine an orientation of the trainee based on the location data of the plurality of shock units.

16. The virtual combat training system of claim 10, wherein the body node is configured to be communicatively coupled to the central control unit and to the plurality of shock units, the body node further configured to receive the location data from each of the plurality of shock units, communicate the location data to the central control unit, receive instructions for the plurality of shock units and the virtual technology helmet from the central control unit, and communicate the instructions to the plurality of shock units and the virtual technology helmet.

17. The virtual combat training system of claim 16, wherein the plurality of shock units is hard-wired to the body node.

18. The virtual combat training system of claim 16, wherein the plurality of shock units is wirelessly coupled to the body node.

* * * * *